United States Patent
Cho (10) Patent No.: US 9,779,493 B2
(45) Date of Patent: Oct. 3, 2017

(54) METHOD OF DETECTING UNIQUE PORTION AND METHOD OF SETTING ADDRESS POINT OF MEASURING APPARATUS USING THE SAME

(71) Applicant: SAMSUNG ELECTRONICS CO., LTD., Suwon-si, Gyeonggi-do (KR)

(72) Inventor: Hyungjoon Cho, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 24 days.

(21) Appl. No.: 15/069,658

(22) Filed: Mar. 14, 2016

(65) Prior Publication Data
US 2017/0046828 A1 Feb. 16, 2017

(30) Foreign Application Priority Data
Aug. 11, 2015 (KR) .................... 10-2015-0113387

(51) Int. Cl.
*G06K 9/00* (2006.01)
*G06T 7/00* (2017.01)

(52) U.S. Cl.
CPC .......... *G06T 7/0004* (2013.01); *G06T 7/0042* (2013.01); *G06T 2207/30148* (2013.01)

(58) Field of Classification Search
CPC .................... G06T 2207/30148; G06T 7/0004
See application file for complete search history.

(56) References Cited

U.S. PATENT DOCUMENTS

| 8,073,242 B2 | 12/2011 | Miyamoto et al. |
| 8,742,375 B2 | 6/2014 | Kawasaki |
| RE45,224 E | 10/2014 | Miyamoto et al. |
| 2010/0001186 A1* | 1/2010 | Hwang ................. H01J 37/153 250/311 |
| 2015/0287201 A1* | 10/2015 | Shinoda .................. H01L 22/12 382/144 |

FOREIGN PATENT DOCUMENTS

JP 2012-104264 5/2012

* cited by examiner

*Primary Examiner* — Phuoc Tran
(74) *Attorney, Agent, or Firm* — F. Chau & Associates, LLC (57) ABSTRACT

A method of setting an address point (AP) of a measuring apparatus includes generating an original image using design data, generating a first simplified image by extending sizes of patterns in the original image, searching for at least one vertex in the first simplified image, and setting a predetermined region including the at least one vertex as the AP upon locating the at least one vertex.

20 Claims, 12 Drawing Sheets

METHOD OF DETECTING UNIQUE PORTION AND METHOD OF SETTING ADDRESS POINT OF MEASURING APPARATUS USING THE SAME

CROSS-REFERENCE TO RELATED APPLICATIONS

This application claims priority under 35 U.S.C. §119 to Korean Patent Application No. 10-2015-0113387 filed on Aug. 11, 2015, the disclosure of which is hereby incorporated by reference in its entirety.

TECHNICAL FIELD

Exemplary embodiments of the inventive concept relate to a method of detecting a unique portion of a wafer pattern, and a method of setting an address point of a measuring apparatus using the same.

DISCUSSION OF THE RELATED ART

Methods of forming semiconductor devices include a process of checking whether patterns formed on a wafer are the same as designed patterns. The patterns formed on the wafer can be measured by a measuring apparatus such as, for example, a scanning electron microscope (SEM). The measuring apparatus may set an address point (AP) to precisely locate a position to be measured. The AP may include a unique portion to be distinguished from the vicinity thereof. Various studies on reducing the time required to set the AP in the measuring apparatus have been in progress.

SUMMARY

Exemplary embodiments of the inventive concept provide a method of searching for a unique portion in a layout image to rapidly locate the unique portion, which is distinguished from the vicinity thereof, and a method of setting an address point (AP) of a measuring apparatus using the same.

Exemplary embodiments of the inventive concept provide a method of setting an AP of a measuring apparatus to reduce the time required to set the AP.

Exemplary embodiments of the inventive concept provide a method of setting an AP of a measuring apparatus to enhance a search rate of the AP.

According to an exemplary embodiment of the inventive concept, a method of setting an AP of a measuring apparatus includes generating an original image using design data, generating a first simplified image by extending sizes of patterns in the original image, searching for at least one vertex in the first simplified image, and setting a predetermined region including the at least one vertex as the AP upon locating the at least one vertex.

Extending the sizes of the patterns may include extending lengths of each pattern in a first direction and in a second direction substantially perpendicular to the first direction by a predetermined length.

The method may further include generating the first simplified image at least one additional time by decreasing a degree in which the sizes of the patterns increase in response to the at least one vertex not being located in the first simplified image.

The method may further include generating the first simplified image at least one additional time by increasing the degree in which sizes of the patterns increase when the number of the vertices determined to be in the first simplified image is greater than a set value.

The method may further include generating a second simplified image by reducing sizes of patterns in the first simplified image, and searching for the at least one vertex in the second simplified image.

A degree in which the sizes of the patterns decrease when generating the second simplified image may be substantially the same as the degree in which the sizes of the patterns increase when generating the first simplified image.

According to an exemplary embodiment of the inventive concept, a method of setting an AP of a measuring apparatus includes generating an original image using design data, generating a simplified image by simplifying the original image, searching for at least one unique portion in the simplified image, and setting a predetermined region including the unique portion as the AP upon locating the at least one unique portion. Simplifying the original image includes adjusting sizes of patterns in the original image.

Searching for the unique portion in the simplified image may include searching for at least one closed curve in the simplified image.

Searching for the unique portion in the simplified image may further include searching for at least one vertex in the simplified image when a closed curve is determined not to be in the simplified image.

The method may further include generating the simplified image at least one additional time by decreasing a degree in which the sizes of the patterns are adjusted in the original image when the closed curve and the vertex are determined not to be in the simplified image.

According to an exemplary embodiment of the inventive concept, a measuring apparatus includes a stage for receiving and moving a wafer, a stage driver unit for driving the stage, an electron gun for projecting an electron beam onto the wafer, a memory storing a computer program, and a processor. The processor is configured to execute the computer program. The computer program is configured to generate an original image using design data, generate a first simplified image by extending sizes of patterns in the original image, search for at least unique portion in the first simplified image, and set an address point (AP) of the measuring apparatus. The address point is a predetermined region including the at least one unique portion.

BRIEF DESCRIPTION OF THE DRAWINGS

The above and other features of the present inventive concept will become more apparent by describing in detail exemplary embodiments thereof with reference to the accompanying drawings, in which.

DETAILED DESCRIPTION OF THE EXEMPLARY EMBODIMENTS

Particular structural and functional descriptions regarding embodiments of the inventive concept set forth herein are provided to explain these embodiments. These embodiments are provided so that this disclosure is thorough and complete and fully conveys the inventive concept to those skilled in the art. Thus, the inventive concept may be accomplished in other various embodiments and should not be construed as limited to the embodiments set forth herein.

Like reference numerals may refer to like elements throughout the accompanying drawings. In the drawings, the lengths and thicknesses of layers and regions may be exaggerated for clarity. In addition, it will be understood that when a first element is referred to as being "on" a second element, the first element may be directly on the second element, or a third element may be interposed between the first element and the second element.

It will be understood that, although the terms including ordinal numbers such as "first," "second," etc. may be used herein to describe various elements, these terms are only used to distinguish one element from another. For example, a second element could be termed a first element without departing from the teachings of the present inventive concept, and similarly a first element could be also termed a second element.

The terminology used herein to describe embodiments of the inventive concept is not intended to limit the scope of the inventive concept. As used herein, the singular forms "a", "an", "the", etc., are intended to include the plural forms as well, unless the context clearly indicates otherwise.

Herein, when two or more elements or values are described as being substantially the same as or about equal to each other, it is to be understood that the elements or values are identical to each other, indistinguishable from each other, or distinguishable from each other but functionally the same as each other as would be understood by a person having ordinary skill in the art. Further, when two directions are described as being substantially parallel or perpendicular to each other, it is to be understood that the two directions are exactly parallel or perpendicular to each other, or are approximately parallel or perpendicular to each other as would be understood by a person having ordinary skill in the art.

Figure 1:
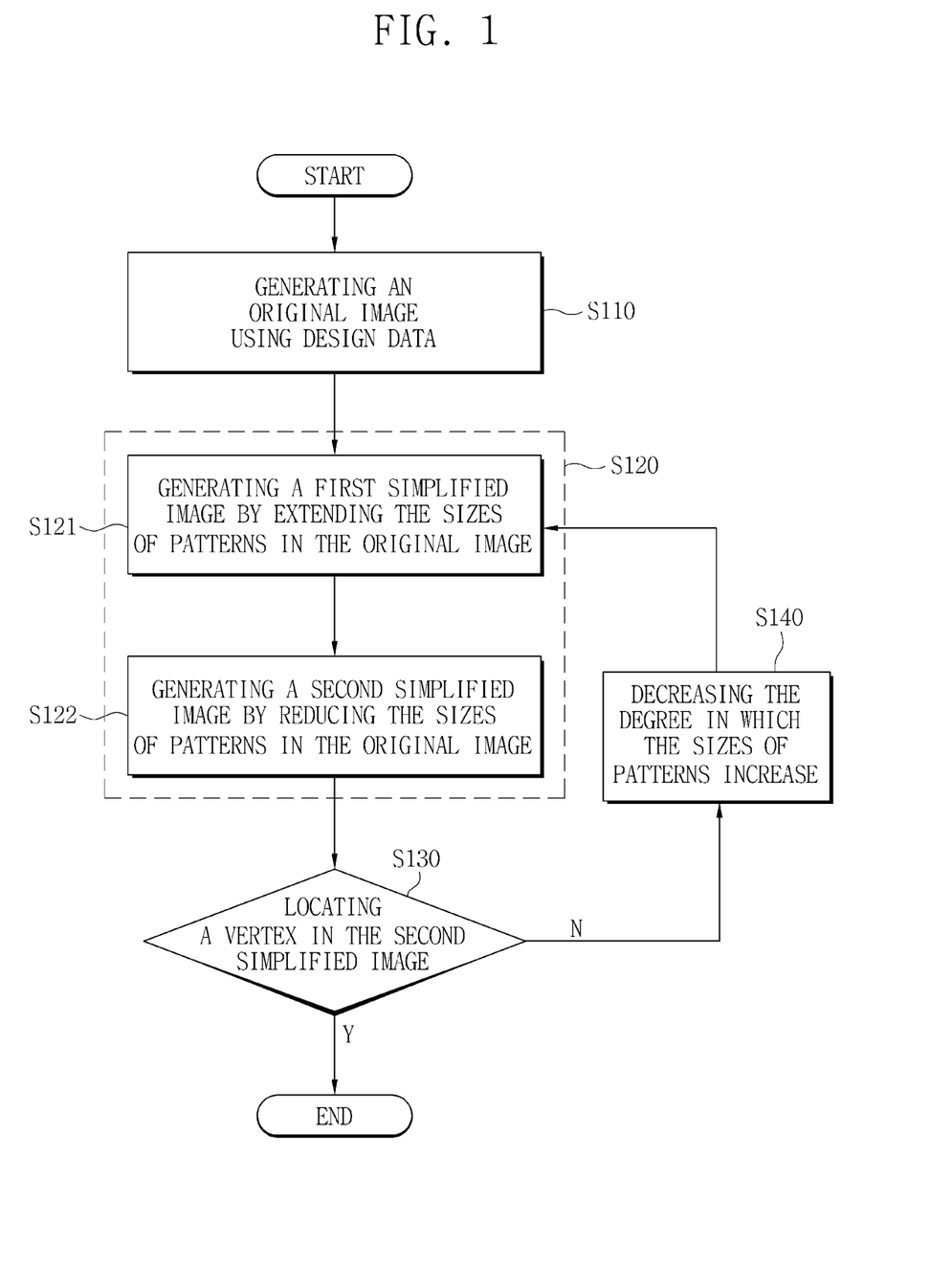
FIG. 1 is a flowchart describing a method of detecting a unique portion in a layout image according to an exemplary embodiment of the inventive concept.

FIG. 1 is a flowchart describing a method of detecting a unique portion according to an exemplary embodiment of the inventive concept. FIGS. 2A, 2B, 3A, 3B, 4A, and 4B are views sequentially illustrating images of the method of detecting the unique portion according to an exemplary embodiment of the inventive concept.

Figure 2A:
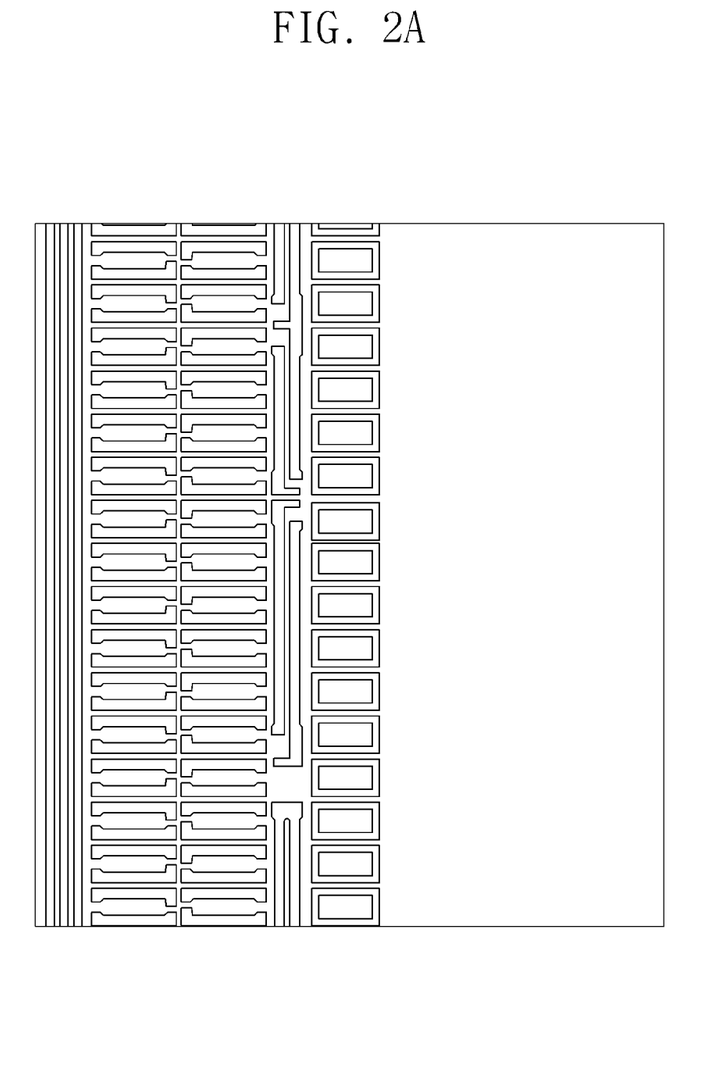
FIGS. 2A, 2B, 3A, 3B, 4A, and 4B are views sequentially illustrating images of the method of detecting the unique portion according to an exemplary embodiment of the inventive concept.
Figure 2B:
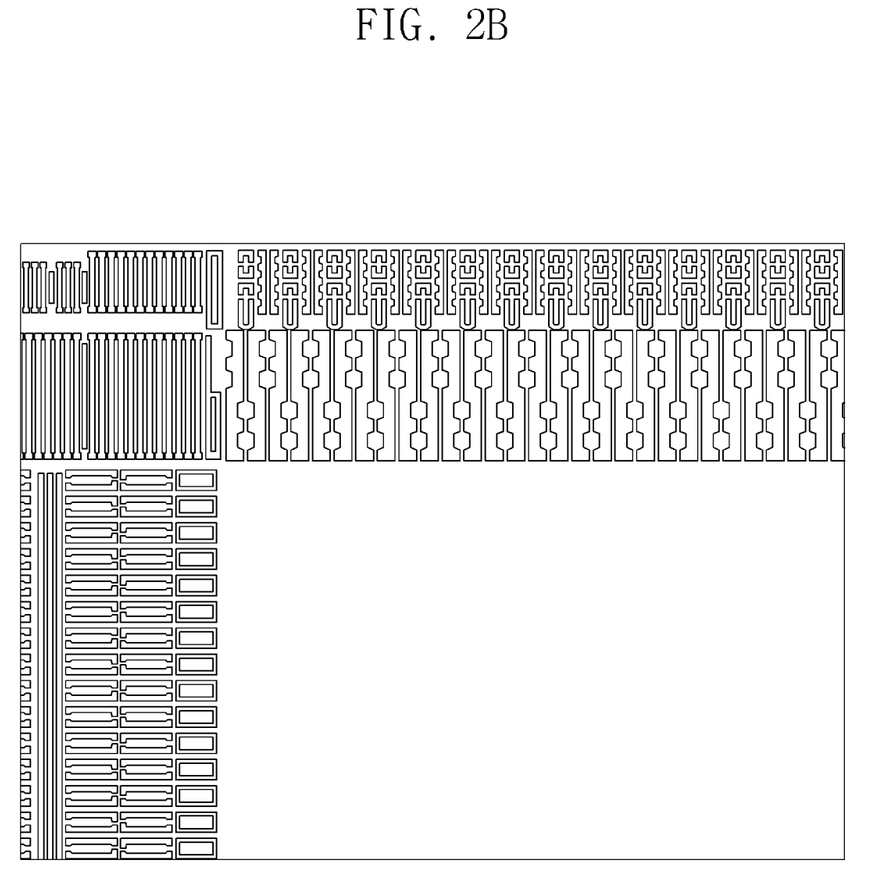

A method of detecting a unique portion according to an exemplary embodiment of the inventive concept will be described with reference to FIGS. 1, 2A, 2B, 3A, 3B, 4A, and 4B. Referring to FIGS. 1, 2A, and 2B, a method of detecting a unique portion according to an exemplary embodiment of the inventive concept may include generating an original image using design data (S110).

The original image may be in an imaging format of general layout images. For example, the original image may include a graphic data system (GDS) image or an OASIS image generated using design data. However, the original image is not limited thereto.

Referring to FIG. 1, a method of detecting the unique portion in a layout image according to an exemplary embodiment of the inventive concept may include simplifying an original image (S120).

The process of simplifying the original image (S120) may include, for example, generating a first simplified image (S121) and generating a second simplified image (S122). An exemplary original image is shown in FIGS. 2A and 2B.

Figure 3A:
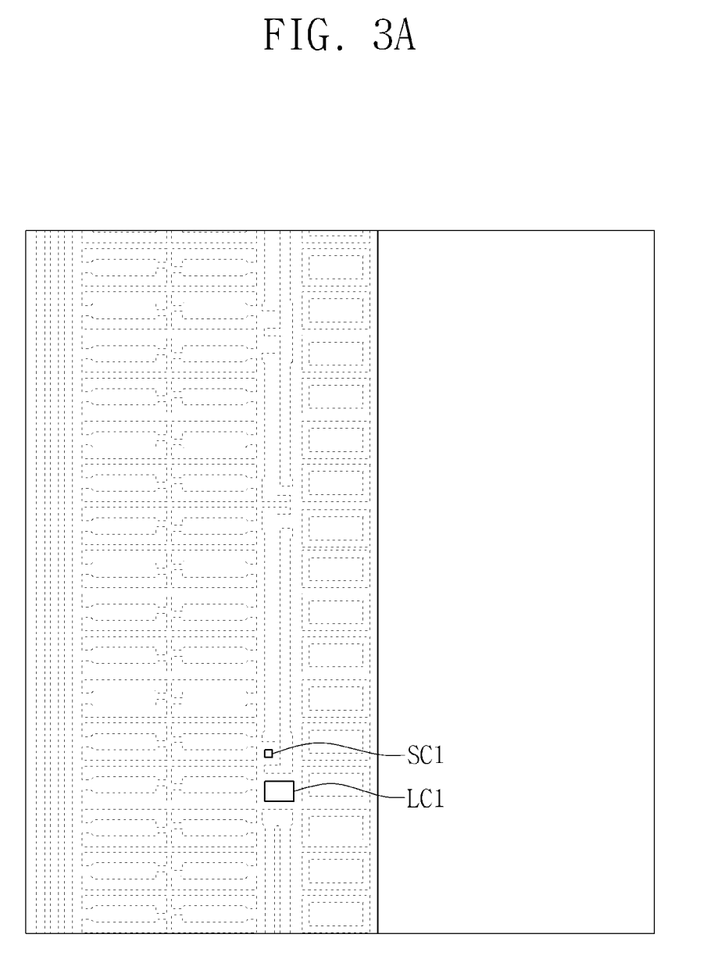
Figure 3B:
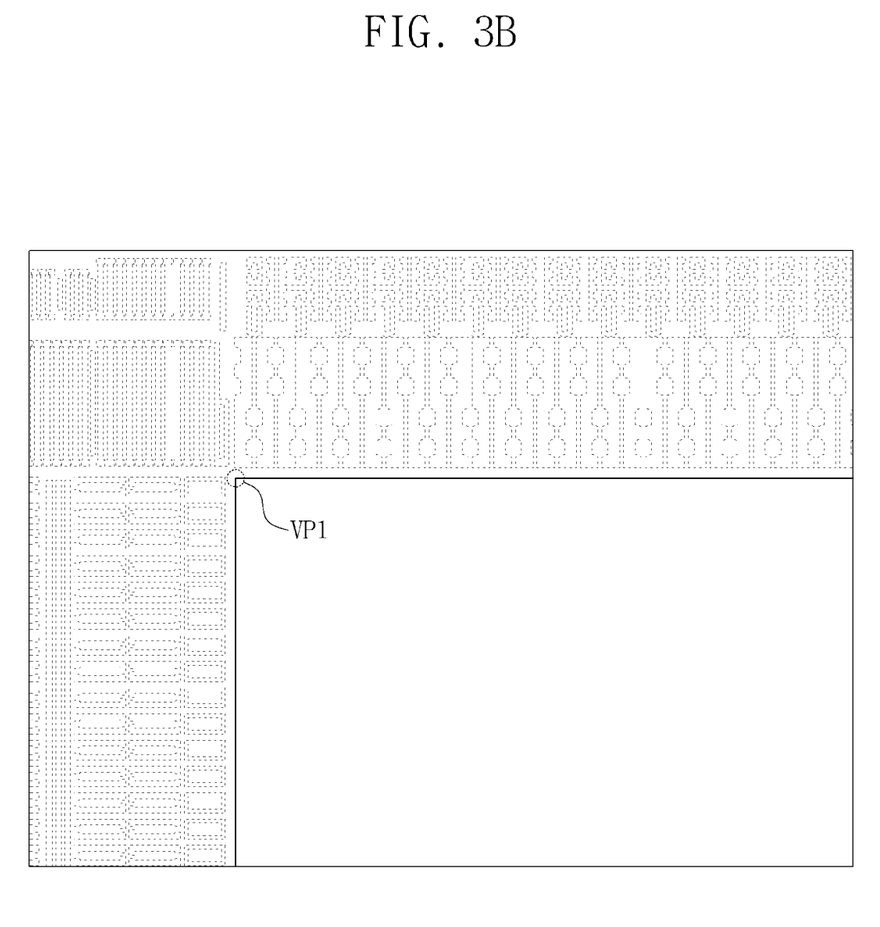

As shown in FIGS. 1, 3A and 3B, generating the first simplified image (S121) may include extending the sizes of patterns in the original image. For example, generating the first simplified image (S121) may include extending a length of each pattern in the original image by a predetermined length in a first direction and extending a length of each pattern in the original image by a predetermined length in a second direction substantially perpendicular to the first direction.

Although the method of detecting the unique portion described herein includes generating the first simplified image by increasing the length of each pattern in the original image by a predetermined length in the first and second directions, the inventive concept is not limited thereto. For example, in an exemplary embodiment, the method of detecting a unique portion may include generating a first simplified image by extending a size of each pattern in an original image by a predetermined proportion.

The first simplified image may include closed curves SC1 and LC1, and a vertex VP1. The closed curves SC1 and LC1 may be located in regions having relatively great separation distances between adjacent patterns in the original image. In the original image, a region having smaller separation distances between adjacent patterns than the region in which the closed curves SC1 and LC1 are formed may appear as one pattern in the first simplified image. The vertex VP1 may be located in a region in which directions of arranged patterns are changed in the original image. For example, the vertex VP1 may be located in a region in which arranged patterns in a first direction and in a second direction substantially perpendicular to the first direction intersect each other, but in which the patterns are not formed therein. Thus, the vertex VP1 corresponds to a region in which directions of arranged patterns are changed in the original image.

Figure 4A:
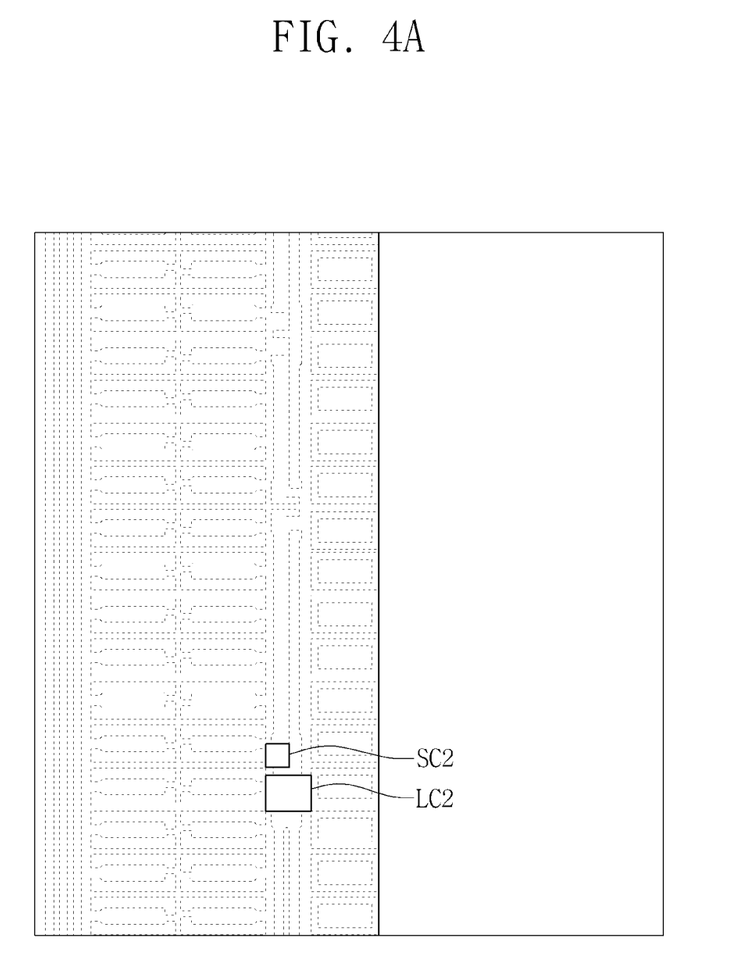
Figure 4B:
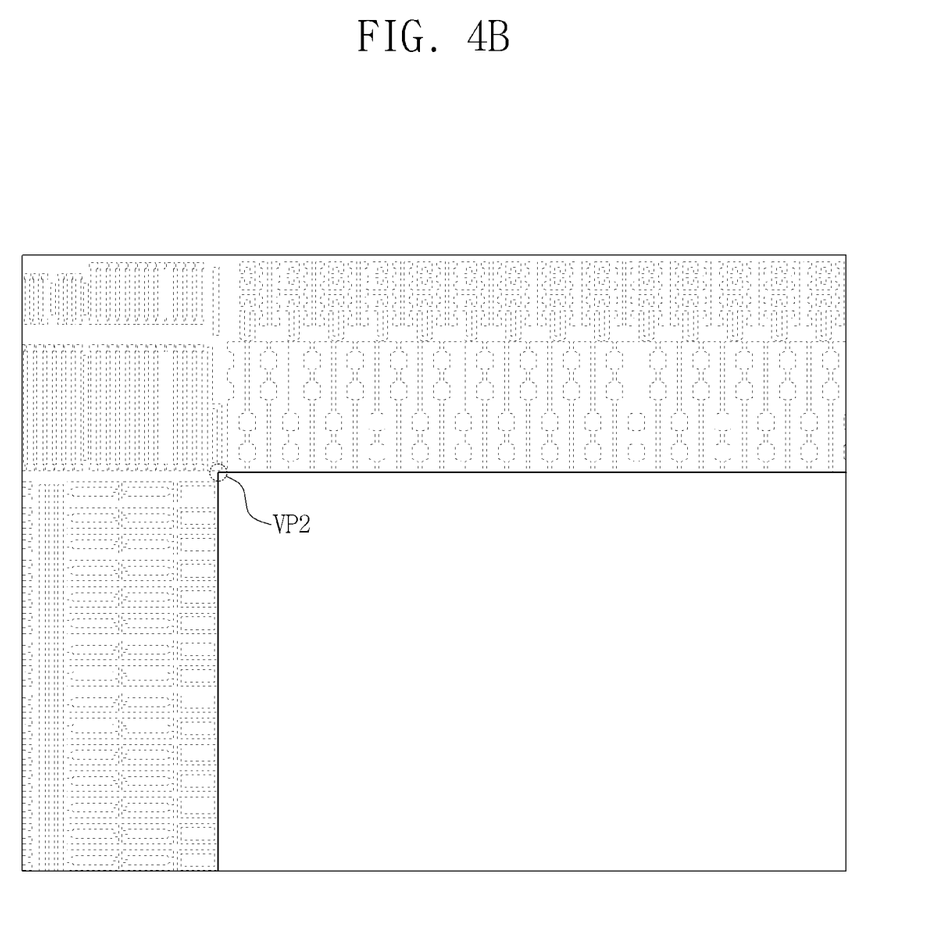

As shown in FIGS. 1, 4A and 4B, generating the second simplified image (5122) may include reducing the sizes of the patterns in the first simplified image. For example, generating the second simplified image (S122) may include reducing a length of each pattern by a predetermined length in the first simplified image in a first direction and reducing a length of each pattern by a predetermined length in a second direction substantially perpendicular to the first direction.

In an exemplary embodiment, the degree in which the sizes of the patterns decrease when generating the second simplified image may be substantially the same as the degree in which the sizes of the patterns increase when generating the first simplified image.

In a method of detecting a unique portion according to an exemplary embodiment of the inventive concept, generating the second simplified image (S122) includes controlling the sizes of the patterns in the same manner as generating the first simplified image (S121). However, the inventive concept is not limited thereto. For example, in a method of detecting a unique portion according to an exemplary embodiment of the inventive concept, generating the second simplified image (S122) may include controlling the sizes of the patterns in a different manner than generating the first simplified image (S121). For example, in an exemplary embodiment of the inventive concept, generating the first simplified image (S121) may include extending a size of each pattern in the original image by a predetermined rate, and generating the second simplified image (S122) may include reducing lengths of each pattern in the first simplified image by a predetermined length in a first direction and in a second direction.

The second simplified image may include closed curves SC2 and LC2, and a vertex VP2. Positions of the closed curves SC2 and LC2 in the second simplified image may correspond to those of the closed curves SC1 and LC1 in the first simplified image. For example, the centers of the closed curves SC2 and LC2 in the second simplified image may be substantially the same as those of the closed curves SC1 and LC1 in the first simplified image. The closed curves SC2 and LC2 in the second simplified image may have enlarged shapes and sizes relative to the closed curves SC1 and LC1 in the first simplified image. Thus, the positions of the closed curves SC2 and LC2 in the second simplified image may be substantially the same as the positions of the closed curves SC1 and LC1 in the first simplified image, and the shapes and sizes of the closed curves SC2 and LC2 in the second simplified image may be enlarged versions of the shapes and sizes of the closed curves SC1 and LC1 in the first simplified image.

Referring to FIGS. 1, 4A and 4B, a method of detecting the unique portion according to an exemplary embodiment of the inventive concept may include searching for at least one vertex in the second simplified image, and locating the at least one vertex (S130) in the second simplified image. Thus, in exemplary embodiments, the unique portion may correspond to at least one vertex. Further, in exemplary embodiments, the unique portion may correspond to at least one closed curve.

When closed curves SC2 and LC2 in the second simplified image are polygonal shapes, the edges of the closed curves SC2 and LC2 may be regarded as a vertex. In a method of detecting the unique portion according to an exemplary embodiment of the inventive concept, locating the at least one vertex (S130) may include, for example, locating regions in which directions of arranged patterns intersect each other and in which separation distances between adjacent patterns are relatively large in the original image. Once at least one vertex has been located, a predetermined region including the at least one vertex may be set as an address point (AP). As described below with reference to FIG. 8, in an exemplary embodiment, the AP is used by a measuring apparatus 1 to move a region of a wafer W corresponding to the AP (e.g., the predetermined region including the at least one vertex) into a measuring position.

Referring to FIG. 1, when a vertex is not found in the second simplified image, detecting the unique portion may include generating the first simplified image again by decreasing the degree in which the sizes of patterns increase when generating the first simplified image (S140). That is, the first simplified image may be regenerated (e.g., generated at least one additional time) by decreasing the degree in which the sizes of patterns increase.

As a result, a method of detecting a unique portion according to an exemplary embodiment of the inventive concept may include simplifying the original image by adjusting the sizes of patterns in the original image, and locating a vertex in the simplified original image. As a result, a method of detecting the unique portion according to exemplary embodiments of the inventive concept may quickly and efficiently find the unique portion to be distinguished from the vicinity thereof. Thus, a method of detecting the unique portion according to exemplary embodiments of the inventive concept may reduce the amount of time required to detect the unique portion.

Figure 5:
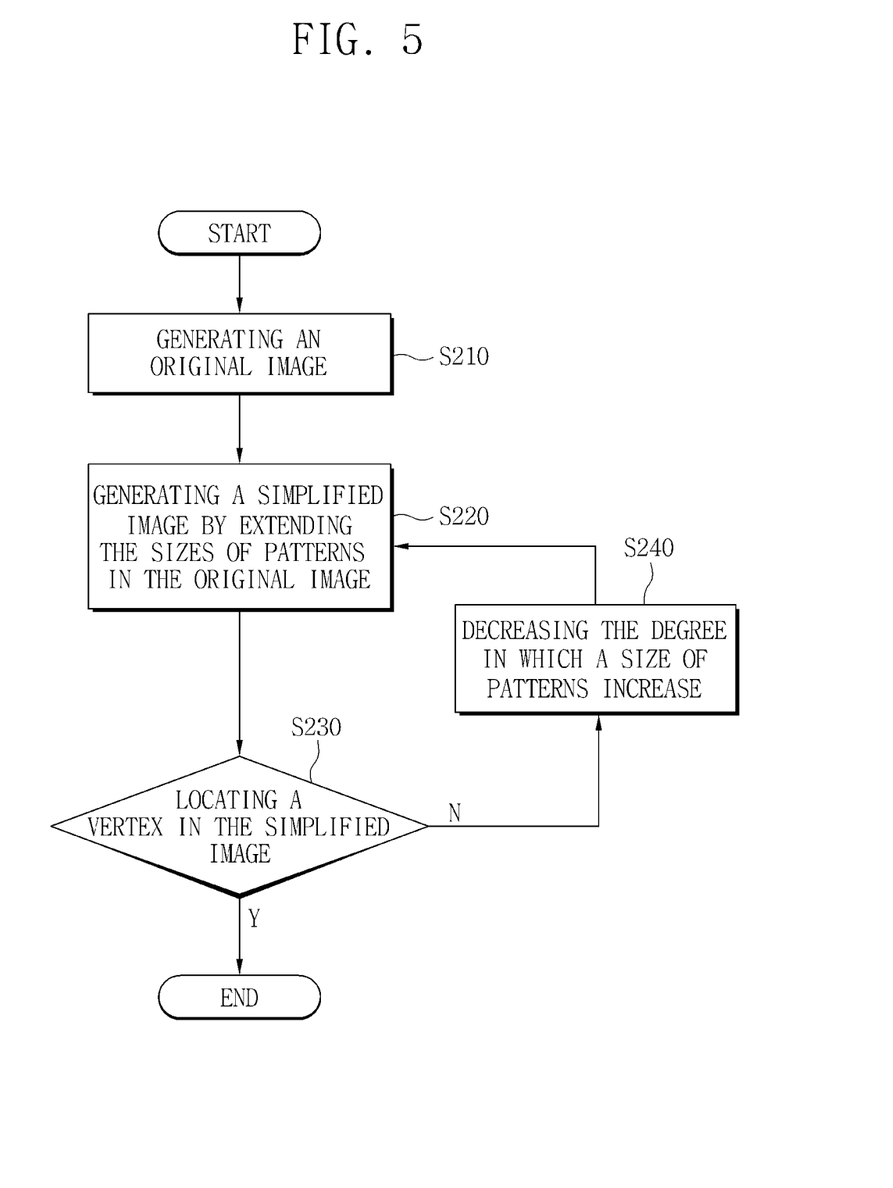
FIG. 5 is a flowchart describing a method of detecting a unique portion in a layout image according to an exemplary embodiment of the inventive concept.

A method of detecting the unique portion according to an exemplary embodiment of the inventive concept is described herein as including generating the first simplified image and the second simplified image by adjusting the sizes of patterns in the original image. However, the inventive concept is not limited thereto. For example, as shown in FIGS. 3A and 3B, since the unique portion is determined in the first simplified image, a method of detecting a unique portion according to an exemplary embodiment of the inventive concept may omit generating the second simplified image (S122). That is, a method of detecting the unique portion according to an exemplary embodiment of the inventive concept may include locating a vertex in a state in which the sizes of patterns in an original image increase. For example, as shown in FIG. 5, a method of detecting a unique portion according to an exemplary embodiment of the inventive concept may include generating an original image (S210), generating a simplified image (S220) by extending the sizes of patterns in the original image, searching for and locating a vertex (S230) in the simplified image, and generating the simplified image again by decreasing the degree in which a size of patterns increase when a vertex in the simplified image is not located therein.

Figure 6:
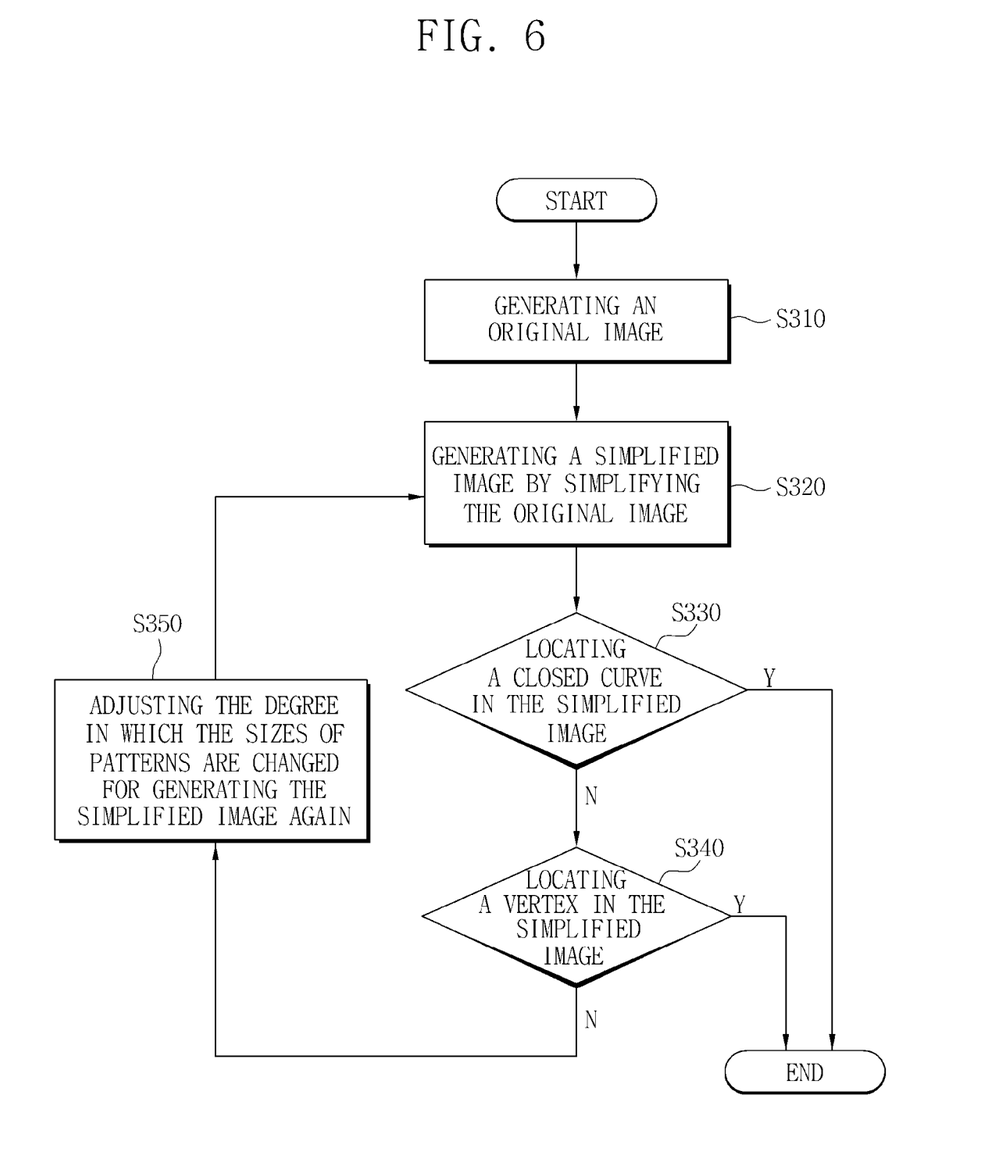
FIG. 6 is a flowchart describing a method of detecting a unique portion in a layout image according to an exemplary embodiment of the inventive concept.

A method of detecting the unique portion according to exemplary embodiments of the inventive concept described with reference to FIGS. 1, 2A, 2B, 3A, 3B, 4A, 4B and 5 include simplifying an original image and locating a vertex. However, the inventive concept is not limited thereto. For example, a method of detecting a unique portion according to an exemplary embodiment of the inventive concept may include simplifying an original image to search for and locate at least one closed curve. For example, as shown in FIG. 6, a method of detecting a unique portion according to an exemplary embodiment of the inventive concept may include generating an original image (S310), generating a simplified image (S320) by simplifying the original image, searching or and locating a closed curve (S330) in the simplified image, searching or and locating a vertex (S340) in the simplified image when a closed curve is not found in the simplified image, and generating the simplified image again by adjusting the degree in which the sizes of patterns are changed in generating the simplified image (S350) when a closed curve and a vertex in the simplified image are not found therein.

Figure 7:
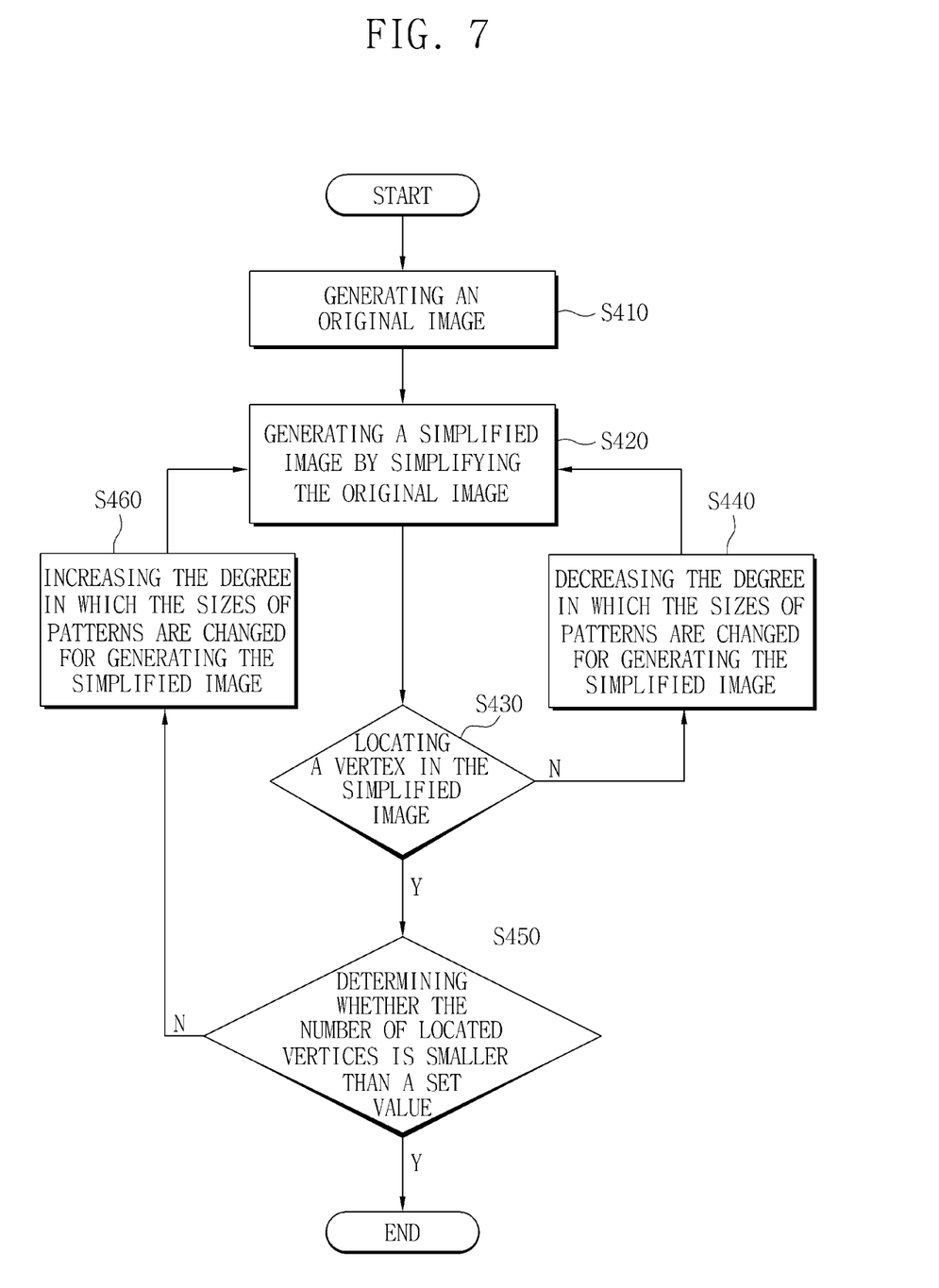
FIG. 7 is a flowchart describing a method of detecting a unique portion in a layout image according to an exemplary embodiment of the inventive concept.

A method of detecting a unique portion according to an exemplary embodiment of the inventive concept may include adjusting the degree in which the sizes of patterns are changed in generating a simplified image corresponding to the number of total vertices determined to be in a simplified image. For example, as shown in FIG. 7, a method of detecting the unique portion according to an exemplary embodiment of the inventive concept may include generating an original image (S410), generating a simplified image (S420) by simplifying the original image, searching for and locating a vertex (S430) in the simplified image, generating the simplified image at least one additional time by decreasing the degree in which the sizes of patterns are changed in generating a simplified image (S440) when a vertex is not found in the simplified image, determining whether the number of the located vertices is smaller than a set value (e.g., a predetermined value) (S450), and generating the simplified image at least one additional time by increasing the degree in which the sizes of patterns are changed in generating a simplified image (S460) when the number of total vertices located is determined to be greater than the set value.

Figure 8:
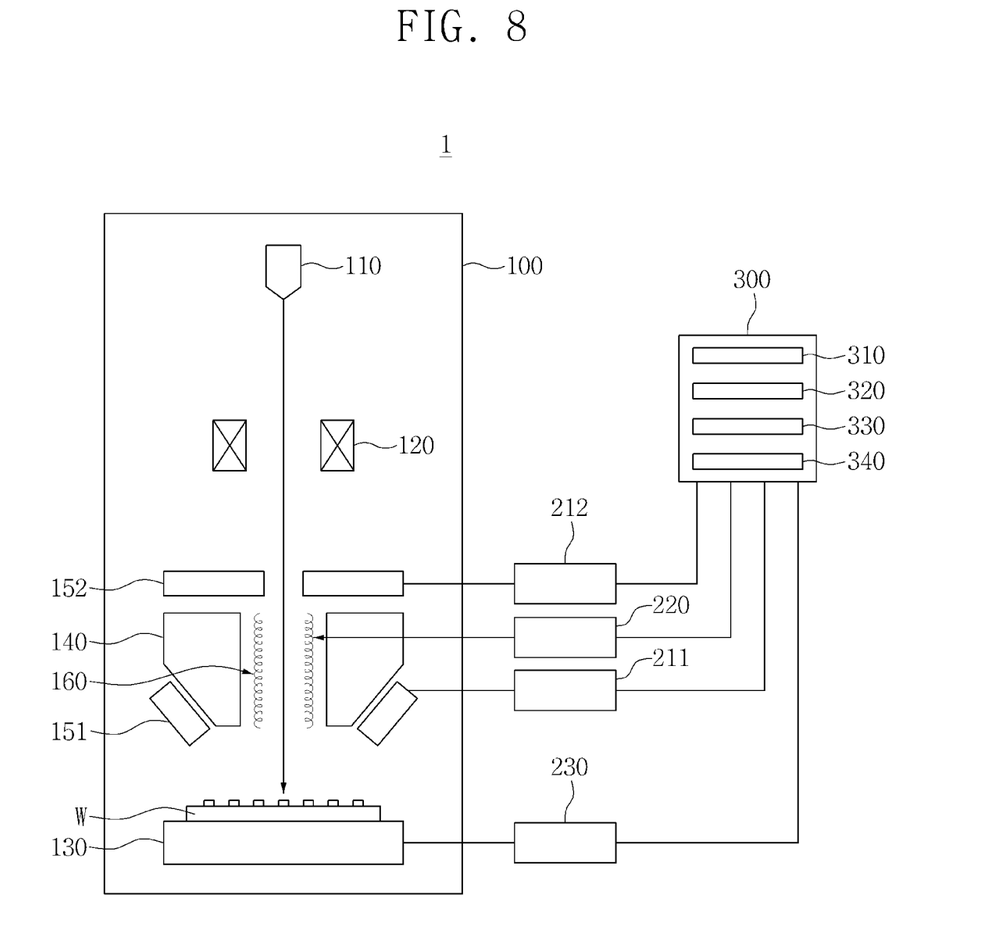
FIG. 8 is a schematic view illustrating a measuring apparatus using the method of detecting the unique portion in a layout image according to an exemplary embodiment of the inventive concept.

FIG. 8 is a schematic view illustrating a measuring apparatus using the method of detecting the unique portion according to an exemplary embodiment of the inventive concept.

Referring to FIG. 8, a measuring apparatus 1 according to an exemplary embodiment of the inventive concept may include a measurement unit 100 and a measurement control unit 300 (e.g., a measurement control circuit). The measurement unit 100 may include an electron gun 110 for projecting an electron beam onto a wafer W on which patterns are formed, a condenser lens 120 for condensing the electron beam generated and transmitted by the electron gun 110 onto a predetermined region (e.g., a region including the AP (e.g., a region including the least one vertex and/or closed curve), as described above) on the wafer W, a stage 130 for receiving and moving the wafer W, an objective lens 140 for focusing the condensed electron beam, a first detector 151 and a second detector 152 for detecting various signals reflected by the wafer W, and a deflection coil 160 to adjust an angle and direction of the electron beam. The measuring apparatus 1 according to an exemplary embodiment of the inventive concept may be, for example, a scanning electron microscope (SEM). The predetermined region is a region set as the AP.

The measuring apparatus 1 may further include a first analog-to-digital (A/D) converter 211 and a second A/D converter 212 for converting various signals detected by the first detector 151 and the second detector 152 into digital signals which will be transmitted to the measurement control unit 300.

The measuring apparatus under control of the measurement control unit 300 may further include a coil control unit 220 for adjusting the deflection coil 160 and a stage driver unit 230 (e.g., a stage driver circuit 230) for driving the stage 130.

The measurement control unit 300 (e.g., measurement control circuit 300) may include a microprocessor 310, a memory 320, a measurement recipe generator 330 (e.g., a measurement recipe generator circuit 330) and a matching unit 340 (e.g., a matching circuit 340).

The microprocessor 310 may control overall operations of the measuring apparatus 1. The memory 320 may store data such as, for example, design data. The measurement recipe generator 330 may set procedures for obtaining an image of a position to be measured on the wafer W by the measuring apparatus 1. For example, the measurement recipe generator 330 may set an evaluation point (EP) and an AP according to a user's request. The matching unit 340 may compare an image obtained by the measurement unit 100 with an original image generated using design data stored in the memory 320. For example, the matching unit 340 may compare an AP in an original image with an AP in an image obtained from the wafer W. The memory 320, the measurement recipe generator 330, and the matching unit 340 may be collectively referred to herein as a memory. This memory may store a computer program that is executed by the processor 310 to perform the method of setting an AP of the measuring apparatus 1, as described herein.

Figure 9:
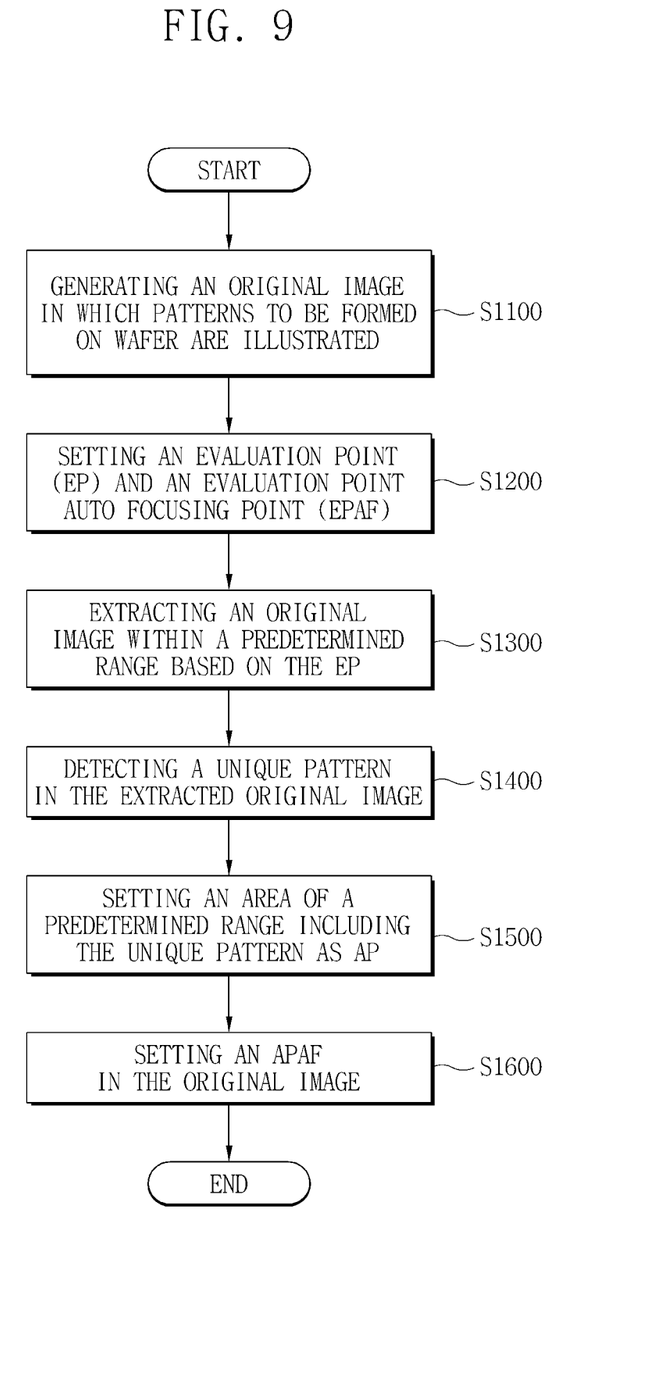
FIG. 9 is a flowchart describing a method of setting an address point of the measuring apparatus using the method of detecting the unique portion in a layout image according to an exemplary embodiment of the inventive concept.

FIG. 9 is a flowchart describing a method of setting an AP of the measuring apparatus using a method of detecting the unique portion according to an exemplary embodiment of the inventive concept.

Referring to FIGS. 8 and 9, a method of setting an AP of a measuring apparatus 1 according to an exemplary embodiment of the inventive concept will be described. First, the method may include generating an original image (S1100) in which patterns to be formed on wafer W are illustrated.

Generating the original image (S1100) may include imaging a layout. For example, generating the original image (S1100) may include generating an OASIS image or a GDS image using design data stored in the memory 320 of the measuring apparatus 1.

The method may further include setting an EP and an evaluation point auto focusing point (EPAF) (S1200). Here, the EPAF may refer to a position focused on to obtain an image of the EP of a wafer.

The method may further include extracting an original image within a predetermined range based on the EP (S1300), and detecting a unique pattern in the extracted original image (S1400).

The predetermined range may be determined in consideration of the accuracy of the measuring apparatus 1. For example, the predetermined range may be a range in which the measuring apparatus 1 obtains an image without moving the stage 130. The predetermined range may be determined by an angle and direction of the electron beam adjusted by the deflection coil 160 of the measuring apparatus 1.

The method of setting the AP of the measuring apparatus 1 according to an exemplary embodiment is described herein as including extracting the original image within the predetermined range based on the EP to set the AP. Therefore, in a method of setting the AP of the measuring apparatus 1 according to an exemplary embodiment, when a plurality of EPs are set, an AP corresponding to each EP may be set by, for example, a parallel process.

Extracting the unique pattern (S1400) may include detecting the unique portion according to the exemplary embodiment as described with reference to FIGS. 1 and 5 to 7. For example, as shown in FIG. 1, extracting the unique pattern (S1400) may include generating a first simplified image (S121) by extending the sizes of patterns in the original image, generating a second simplified image (S122) by reducing the sizes of patterns in the first simplified image, searching for and locating a vertex (S130) in the second simplified image, and generating the first simplified image again by decreasing the degree in which the sizes of patterns increase (S140) when a vertex is not located in the simplified image.

The method of setting the AP of the measuring apparatus 1 may further include setting an area of a predetermined range including the unique pattern as the AP (S1500).

The method of setting the AP may further include setting an APAF (S1600) in the original image to focus on when an image of the AP is obtained.

As a result, the method of setting the AP of the measuring apparatus 1 according to an exemplary embodiment of the inventive concept may reduce the time required to set the AP by setting the AP to locate the vertex in the simplified image simplified from the original image. Further, the method of setting the AP of the measuring apparatus 1 according to an exemplary embodiment of the inventive concept may enhance a search rate of the AP by setting a region clearly distinguished from the vicinity thereof as the AP.

A method of detecting a unique portion and a method of setting an AP of a measuring apparatus using the same according to exemplary embodiments of the inventive concept may rapidly check the unique portion distinguished from the vicinity thereof. Therefore, the method of setting the AP of the measuring apparatus may reduce the time required to set the AP. Further, the method of detecting the unique portion and the method of setting the AP of the measuring apparatus using the same according to exemplary embodiments of the inventive concept may detect the unique portion distinguished from the vicinity thereof. Accordingly, the method of setting the AP of the measuring apparatus according to exemplary embodiments of the inventive concept may enhance a search rate of the AP. Therefore, the method of setting the AP of the measuring apparatus according to exemplary embodiments of the inventive concept may enhance the efficiency of measurements.

While the present inventive concept has been particularly shown and described with reference to the exemplary embodiments thereof, it will be understood by those of ordinary skill in the art that various changes in form and detail may be made therein without departing from the spirit and scope of the present inventive concept as defined by the following claims.

What is claimed is:

1. A method of setting an address point (AP) of a measuring apparatus, comprising:
    generating an original image using design data;
    generating a first simplified image by extending sizes of patterns in the original image;
    searching for at least one vertex in the first simplified image; and
    setting a predetermined region including the at least one vertex as the AP upon locating the at least one vertex.

2. The method of claim 1, wherein extending the sizes of the patterns comprises extending lengths of each pattern in a first direction and in a second direction substantially perpendicular to the first direction by a predetermined length.

3. The method of claim 1, further comprising:
    generating the first simplified image at least one additional time by decreasing a degree in which the sizes of the patterns increase in response to the at least one vertex not being located in the first simplified image.

4. The method of claim 1, further comprising:
    generating the first simplified image at least one additional time by increasing a degree in which the sizes of the patterns increase in response to determining that a number of vertices located in the first simplified image is greater than a set value.

5. The method of claim 1, further comprising:
    generating a second simplified image by reducing sizes of patterns in the first simplified image; and
    searching for the at least one vertex in the second simplified image.

6. The method of claim 5, wherein a degree in which the sizes of the patterns decrease when generating the second simplified image is substantially the same as a degree in which the sizes of the patterns increase when generating the first simplified image.

7. A method of setting an address point (AP) of a measuring apparatus, comprising:
    generating an original image using design data;
    generating a simplified image by simplifying the original image;
    searching for at least one unique portion in the simplified image; and
    setting a predetermined region including the unique portion as the AP upon locating the at least one unique portion,
    wherein simplifying the original image comprises adjusting sizes of patterns in the original image.

8. The method of claim 7, wherein the original image comprises a graphic data system (GDS) image.

9. The method of claim 7, wherein searching for the at least one unique portion in the simplified image comprises searching for at least one closed curve in the simplified image.

10. The method of claim 9, further comprising:
    generating the simplified image at least one additional time by increasing a degree in which the sizes of the patterns are adjusted in response to determining that a total number of the at least one closed curves located in the simplified image is greater than a set value.

11. The method of claim 9, wherein searching for the at least one unique portion in the simplified image further comprises searching for at least one vertex in the simplified image upon the at least one closed curve not being located in the simplified image.

12. The method of claim 11, further comprising:
    generating the simplified image at least one additional time by decreasing a degree in which the sizes of the patterns in the original image are adjusted upon the at least one closed curve and the at least one vertex not being found in the simplified image.

13. The method of claim 7, wherein the AP is set to include the at least one unique portion positioned within a predetermined distance from an evaluation point (EP).

14. The method of claim 13, wherein generating the simplified image comprises extracting the original image within the predetermined distance from the EP, and simplifying the extracted original image.

15. The method of claim 13, wherein the AP is set to include a closest unique portion positioned closest to the EP when the at least one unique portion positioned within the predetermined distance from the EP is a plurality of unique portions.

16. A method of setting an address point (AP) of a measuring apparatus, comprising:
    generating an original image using design data;
    generating a first simplified image by adjusting sizes of patterns in the original image;
    searching for at least one unique portion in the first simplified image; and
    setting a predetermined region including the at least one unique portion as the AP of the measuring apparatus.

17. The method of claim 16, wherein adjusting the sizes of the patterns comprises extending lengths of each pattern in a first direction and in a second direction substantially perpendicular to the first direction by a predetermined length.

18. The method of claim 16, further comprising:
    generating the simplified image at least one additional time by decreasing a degree in which the sizes of the patterns adjust in response to the at least one unique portion not being located in the simplified image.

19. The method of claim 16, wherein generating the simplified image comprises generating a pre-simplified image by extending sizes of patterns in the original image, and reducing sizes of patterns in the pre-simplified image.

20. The method of claim 16, wherein the at least one unique portion is a vertex or a closed curve.

* * * * *